United States Patent [19]

Allan et al.

[11] Patent Number: 4,850,458
[45] Date of Patent: Jul. 25, 1989

[54] BIDIRECTIONAL ROTARY BRAKE

[75] Inventors: Arthur R. Allan, Mercer Island; David W. King, Seattle, both of Wash.

[73] Assignee: Boeing Company, Seattle, Wash.

[21] Appl. No.: 272,027

[22] Filed: Nov. 16, 1988

[51] Int. Cl.$^4$ .............................................. F16D 67/02
[52] U.S. Cl. .......................................... 188/134; 192/7
[58] Field of Search ................... 188/134, 135; 192/7, 192/8 R

[56]  References Cited

U.S. PATENT DOCUMENTS

| Re. 26,540 | 3/1969 | Kalns | 192/8 |
|---|---|---|---|
| Re. 27,327 | 4/1972 | Kalns | 192/8 |
| 3,285,377 | 11/1966 | Rasmussen | 192/8 |
| 3,367,456 | 2/1968 | Bohnhoff | 188/134 |
| 3,448,840 | 6/1969 | Rosin | 192/8 |
| 3,497,044 | 2/1970 | Kalns | 192/8 |
| 3,499,511 | 3/1970 | Bouhot | 192/56 |
| 3,542,162 | 11/1970 | Kerr | 188/134 |
| 3,596,740 | 8/1971 | Nau | 188/134 |
| 3,621,958 | 11/1971 | Klemm | 192/8 R |
| 3,659,682 | 5/1972 | Meyer et al. | 188/134 |
| 3,667,575 | 5/1972 | Bouhot | 188/134 |
| 3,734,253 | 5/1973 | Derossi | 192/8 C |
| 3,890,803 | 6/1975 | Neal et al. | 64/27 B |
| 3,898,817 | 8/1975 | Capewell et al. | 64/30 E |
| 3,924,479 | 12/1975 | Lanzenberger | 74/89.16 |
| 3,981,186 | 9/1976 | Rauch et al. | 73/151 |
| 4,176,733 | 12/1979 | Twickler | 188/134 |
| 4,260,121 | 4/1981 | Baston et al. | 244/213 |
| 4,597,477 | 7/1986 | Miller | 192/8 R |
| 4,625,843 | 12/1986 | Maltby et al. | 192/8 R |
| 4,693,349 | 9/1987 | Tysver | 192/7 |
| 4,697,672 | 10/1987 | Linton | 188/134 |
| 4,706,791 | 11/1987 | Magliano | 192/8 R |

Primary Examiner—Duane A. Reger
Attorney, Agent, or Firm—Robert H. Sproule; B. A. Donahue

[57]  ABSTRACT

A bidirection brake for a rotary device prevents a reverse load or an overrunning load at the output of the rotary device from rotating the output in either direction. The brake includes a pair of opposing plates having pockets formed in their surfaces which contain movable balls. A reverse load or an overrunning load causes relative motion between the plates which in turn causes the balls to move to shallower parts of the pockets thereby forcing the plates axially apart. As the plates move apart, they each engage respective skewed roller assemblies which inhibit the rotation of the plates and the shafts which are connected to the plates. The breakout and running friction of the skewed roller assemblies are almost equal so that the brake operates smoothly when it is engaged and when it is released.

8 Claims, 5 Drawing Sheets

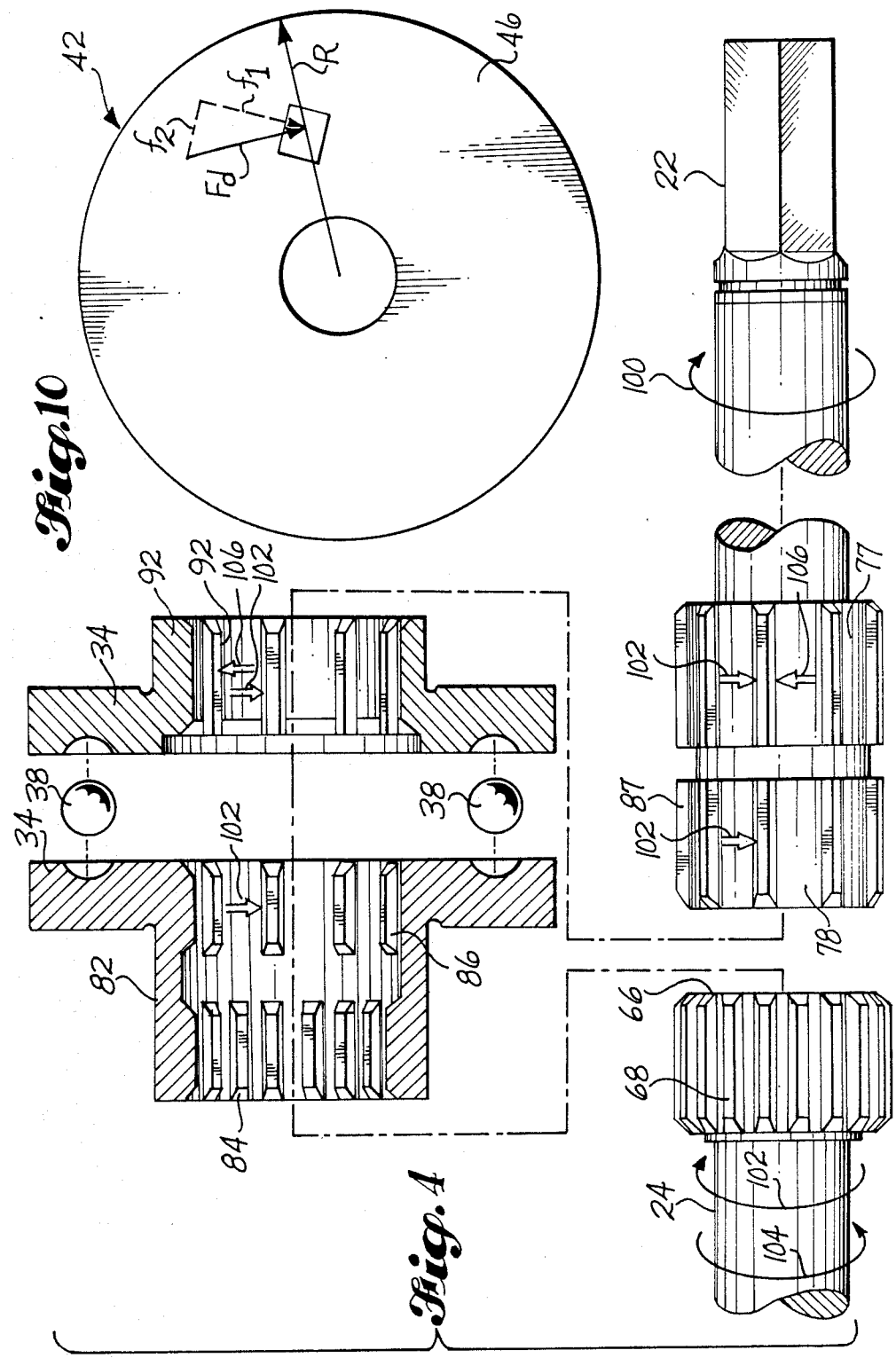

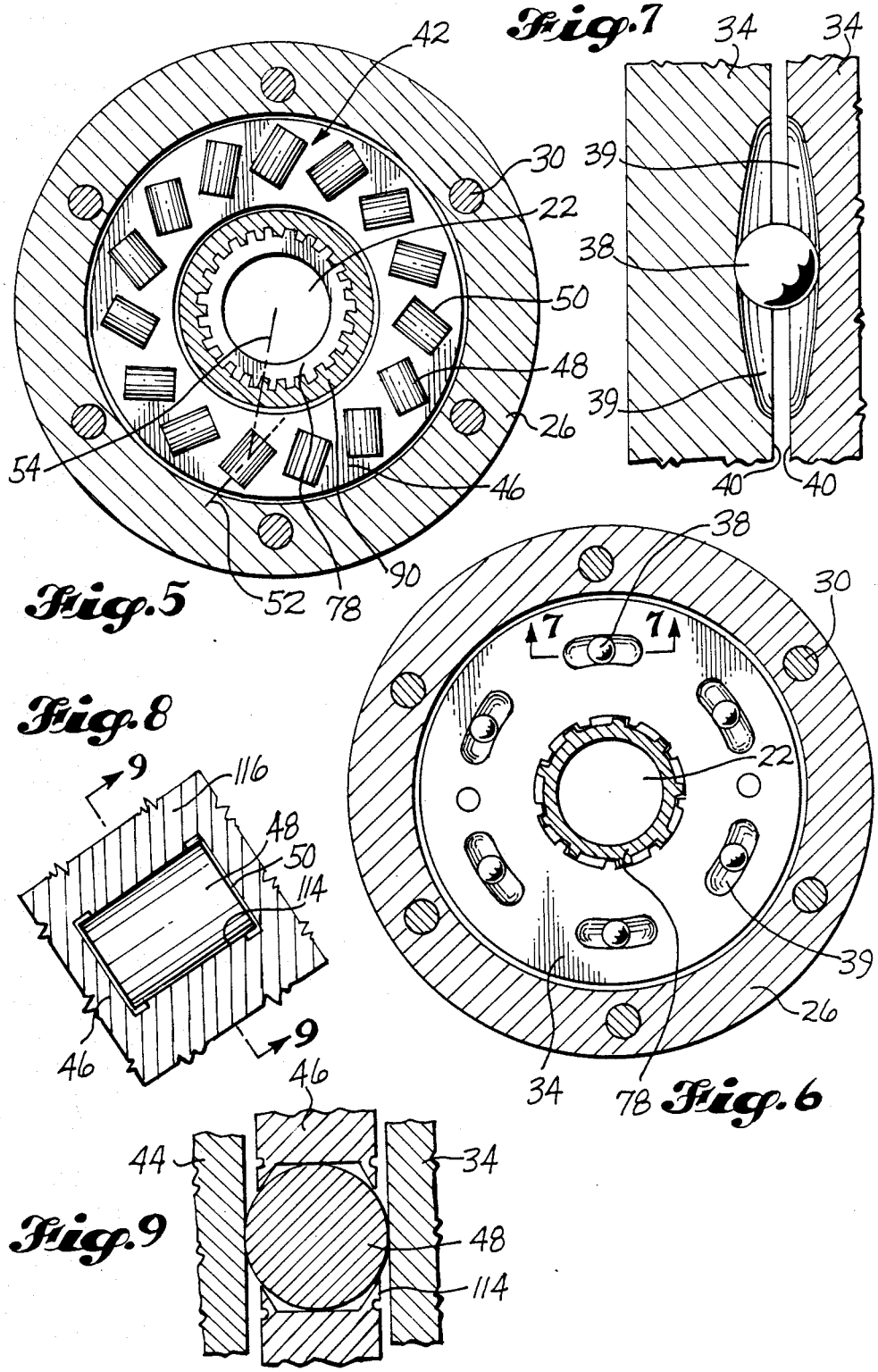

BIDIRECTIONAL ROTARY BRAKE

TECHNICAL FIELD

The present invention pertains to a braking device for preventing either a reverse load or an overrunning load, which is applied to an output shaft of a rotary device, from driving an input shaft of the rotary device.

BACKGROUND OF THE INVENTION

It is desirable when moving a load by means of a motor to employ a device to hold the load in the event the motor becomes disconnected from the load. For example, a load may be supported on the end of a cable and the cable wound around a drum which is driven by a motor through a drive shaft. During the raising of the load, for example, it may occur that the motor becomes accidentally disconnected from the drive shaft. If there are no means for braking the drive shaft or drum, the load can uncontrollably free fall to the ground.

Another example involves the leading edge slats of an aircraft. The slats are extended and retracted by one or more rotary actuators. The rotary actuators are driven by a hydraulic motor which is connected to the rotary actuators by a torque tube. When the slats are extended in the presence of reverse acting air loads, it is important that the slats remain extended in the event of failure of the hydraulic motor or structural failure of the torque tube. Furthermore, when the slats are retracted and subjected to overrunning air loads, it is important that the slats retract in a controlled manner in order to prevent damage to the slat assembly and other related components. Conventionally, there exists conventional brakes which sense when normal operation of the slats has been interrupted, and thereby lock the slats in place.

Other conventional brakes have been disclosed in U.S. Pat. No. 3,285,377 by Rasmussen in which a brake assembly includes rollers which are displaced by a reverse torque to initiate braking.

U.S. Pat. No. 3,367,456 by Behnhoff discloses a brake for limiting the torque transmitted in a drive train by using a ball-ramp drive connection to initiate braking.

Furthermore, U.S. Pat. No. Re. 26,540 and U.S. Pat. No. Re. 27,327 both by Kalns disclose a bidirectional no-back drive device which operates to spread apart a pair of shoes in the presence of reverse torque in order to initiate braking.

And, U.S. Pat. No. 4,597,477 by Miller discloses a bidirectional brake having a ball-ramp assembly which is used to operate a brake to prevent an output shaft from driving an input shaft.

A limitation with regard to conventional bidirectional brakes is apparent during the presence of a so-called "overrunning load". That is, in the presence of an overrunning load, a rotational force is present at the output shaft which acts in the same direction that the output shaft is being rotated by the input shaft. This force wants to rotate the output shaft at a faster rate than it is being driven by the input shaft. Conventional bidirectional brakes operate to brake the output shaft so that it does not overrun the input shaft.

However, in the presence of an overrunning load, conventional bidirectional brakes tend to brake the output shaft in a somewhat jerky manner. This is because the "breakout friction" of the conventional brake is much higher than its "running friction". More specifically, the friction applied by the conventional brake to hold the output shaft is much higher than the shaft friction present when the shaft is rotating. Thus, when the conventional brake releases the output shaft and the torque of the output shaft overcomes the braking friction, the output shaft moves rapidly from its braked state to its rotational state, generating large, momentary rotational forces which are transmitted to elements downstream of the output shaft.

SUMMARY OF THE INVENTION

The present invention pertains to a bidirectional brake which includes rotational shaft means having an input end and an output end, as well as braking plate means which are connected to the shaft means for rotation therewith. Also included in the invention is a skewed roller assembly which includes a planar member which is rotatable about a first axis. The skewed roller assembly further includes roller means which are connected to the planar member such that an axis of rotation of the roller means forms an acute angle with an imaginary radial line extending between the first axis and a circumferential edge of the planar member. Furthermore, there are means for moving the braking plate means into engagement with the skewed roller assembly when a reverse or overrunning load is applied to the output end of the shaft means. The skewed roller assembly provides a frictional drag on the braking plate means so as to limit rotation of the shaft means.

BRIEF DESCRIPTION OF THE DRAWINGS

The present invention will be better understood by referring to the following detailed description in conjunction with the attached drawings, in which:

FIG. 4 is a side view showing the relationship of an input shaft, output shaft, input ball-ramp assembly, and output ball-ramp assembly of the brake;

FIG. 5 is a sectional view of the brake taken along line 5—5 of FIG. 2 and showing a skewed roller assembly;

FIG. 6 is a sectional view of the brake taken along line 6—6 of FIG. 2;

FIG. 7 is a partial sectional view of a ball-ramp assembly taken along line 7—7 of FIG. 6;

FIG. 8 is a view of a skewed roller assembly;

FIG. 9 is a sectional view of the skewed roller taken along line 9—9 of FIG. 8; and FIG. 10 is a diagram showing the force components reacting on the skewed roller.

DETAILED DESCRIPTION

Figure 1:
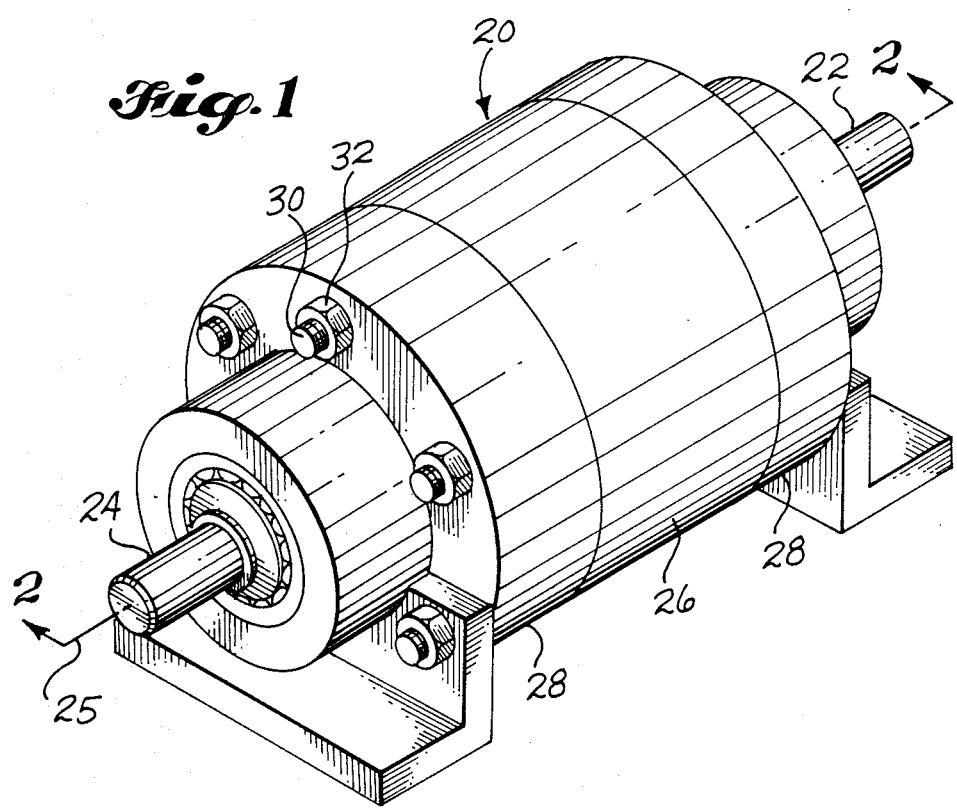
FIG. 1 is an isometric view of the exterior of the bidirectional brake of the present invention.

Referring first to FIG. 1 there is shown the exterior of a bidirectional brake indicated at 20 including a right input shaft 22 and a left output shaft 24 which are supported along a common lengthwise axis shown by a line designated by a number 25. The input shaft 22 may be rotated in either direction by an upstream device (not shown) to produce a similar rotation of the output shaft 24. However, a rotational force at the output shaft which is in opposition to the direction of rotation of the input shaft and which exceeds the rotational force at the input shaft (reverse load), or a rotational force at the output shaft in the direction of rotation of the input shaft which attempts to rotate the output shaft at a greater rate than the input shaft (overrunning load), causes the bidirectional brake to engage the input and output shafts and prevent their further rotation. As soon as the input shaft torque equals or exceeds the output shaft torque (in the case of a reverse load), or the input shaft rotation catches up with the output shaft (in the case of an overrunning load), the brake releases the shafts so that the input shaft can drive the output shaft in a normal manner.

The outside of the bidirectional brake is formed by center annular housing section 26 which is supported between left, right annular housing sections 28. The housing sections 26, 28 are held together by bolts 30 which extend through the sections 26, 28 and which are secured by nuts 32.

Figure 2:
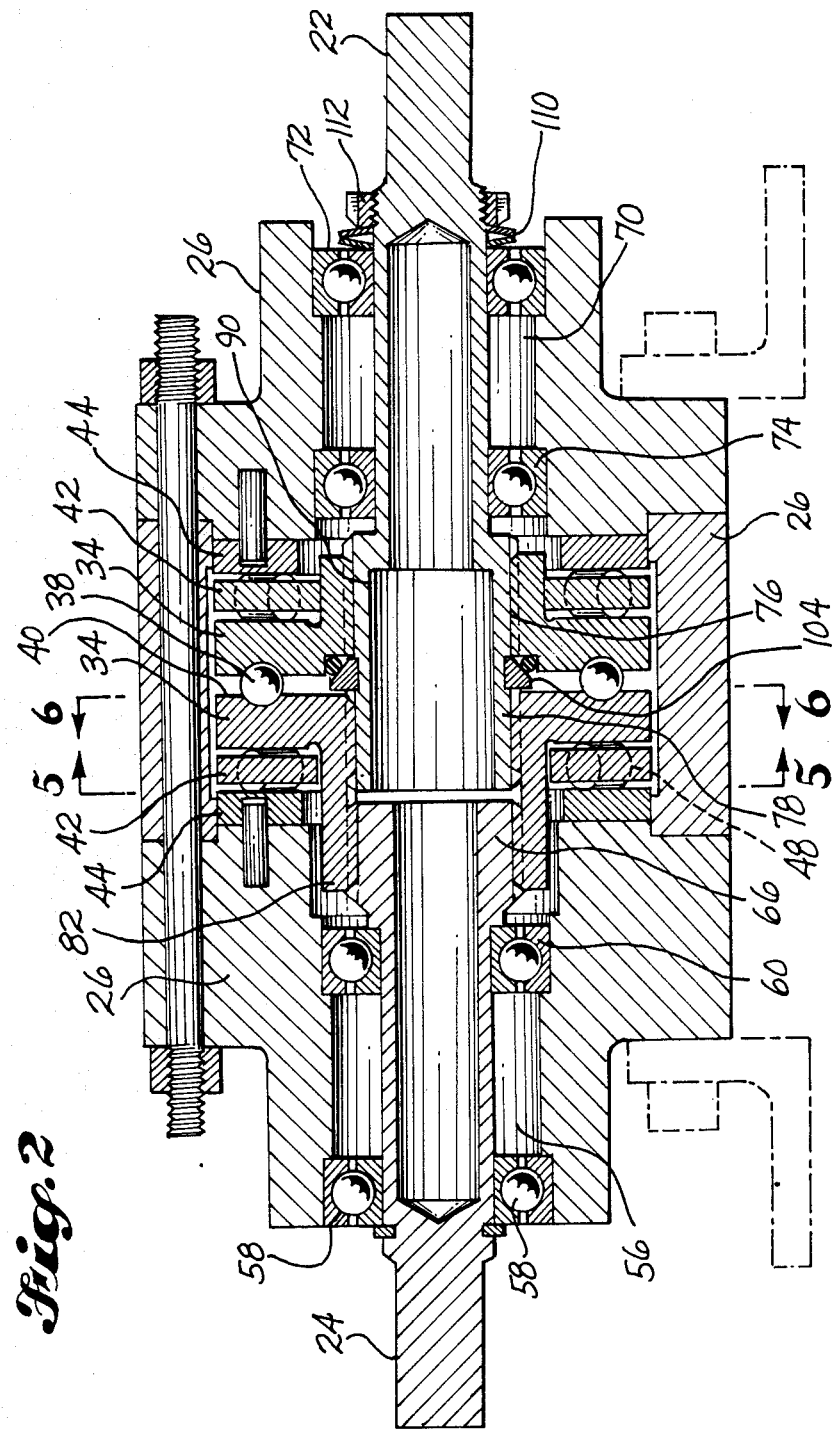
FIG. 2 is a lengthwise sectional view of the bidirectional brake taken along line 2—2 of FIG. 1.
Figure 3:
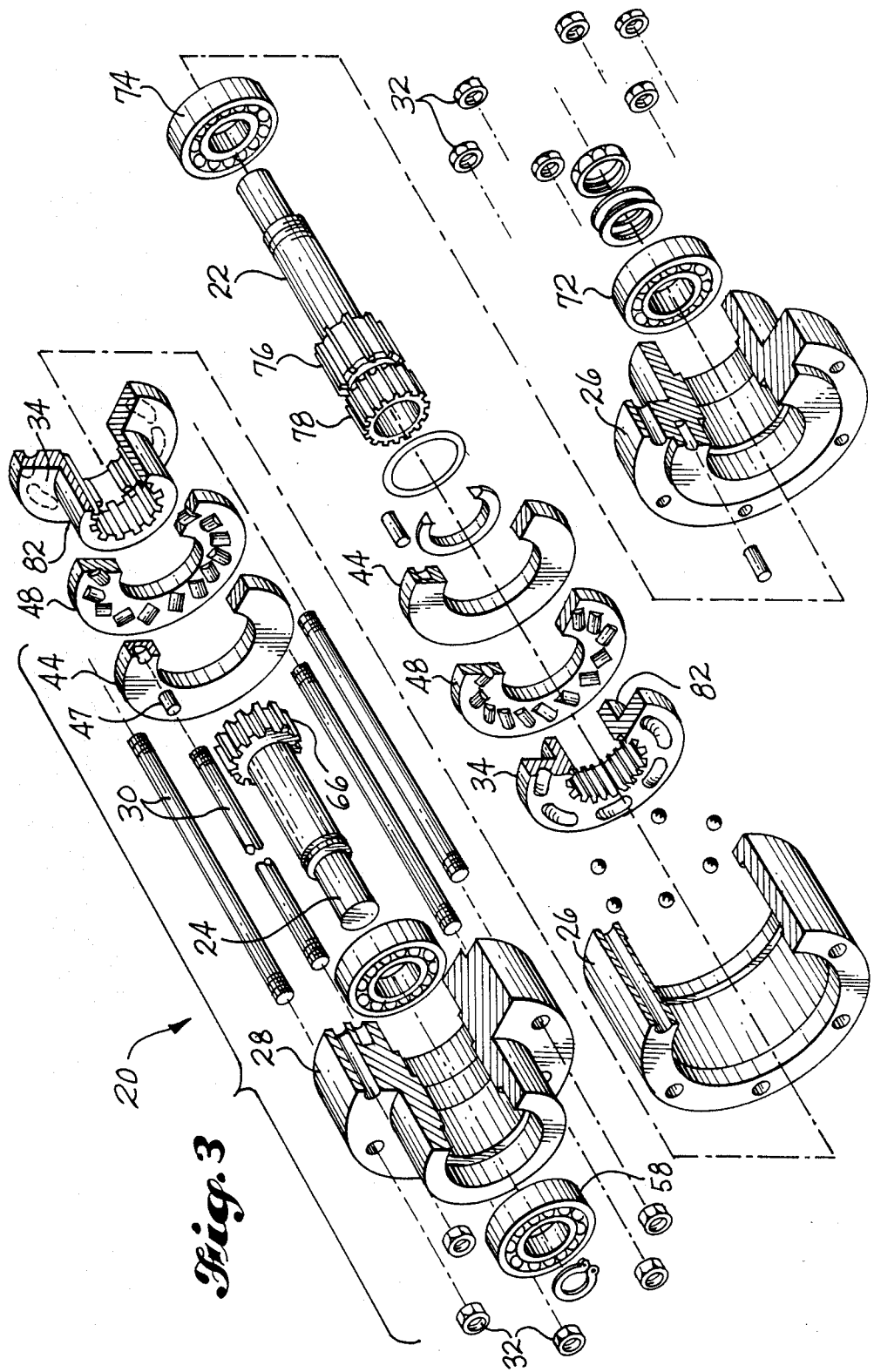
FIG. 3 is an exploded view of the bidirectional brake.

As shown more clearly in FIGS. 2 and 3, additional principal elements of the bidirectional brake include left, right braking plates 34 which support balls 38 therebetween. The left braking plate 34 is splined to the left end of the input shaft 22 as well as to the right end of the output shaft 24, while the right braking plate 34 is splined to the left end of the input shaft 22. As shown in FIG. 7, the balls 38 are held in concave pockets 39 located in the faces 40 of the plates. The pockets 39 are located circumferentially about each plate 34 (FIG. 6). Each pocket 39 tapers downward from its ends to a deeper central portion. As shown in FIG. 7, when the input shaft is driving the output shaft, the plates 34 are aligned such that the balls 38 are positioned at the deepest central parts of the pockets 39.

Mounted to the left of the left brake plate 34 is a left skewed roller assembly 42, and mounted to the right of the right brake plate 34 is a right skewed roller assembly 42; the assembly 42 is shown in greater detail in FIG. 5. In operation, when a reverse load or an overrunning load is applied to the output shaft 24 (FIG. 2), the left brake plate 34 rotates relative to the right brake plate 34. This causes the balls 38 to travel into the shallower portions of the pockets 39 thereby displacing the brake plates 34 axially apart so that the skewed roller assemblies 42 are squeezed between the brake plates 34 and respective friction discs 44. These skewed roller assemblies are the friction elements in this mechanism. This inhibits rotation of the output shaft 24. In this manner the skewed roller assemblies 42 operate as friction elements in the mechanism. The friction discs 44 are connected to the left, right housing sections 28 by pins 47.

As shown in FIG. 5, the conventional skewed roller assembly 42 includes an annular plate 46 containing a number of rollers 48 which are located circumferentially about the plate within rectangular openings 50. Each roller 48 has rotational lengthwise axis indicated by a line 52 which is coplanar with plate 46 and which forms an acute angle with an imaginary line 54 extending radially outward from the center of the plate 46. Due to the skewing of the roller axis 52 relative to the line 54, the roller assembly 42 provides improved braking when the roller assembly is sandwiched between the friction disc 44 and brake plate 34. As shown best in FIG. 2, the surfaces of the rollers 48 extend above and below the plane of the roller assembly plate 46 so that they engage the brake plates and friction discs 44 when the brake plates 34 are spread apart by the ramping of the balls 38. More specifically, when the brake plate 34 engages the roller assembly, a force $F_d$ (FIG. 10) is reacted at the roller 48 which is normal to a radius vector R extending from the center of the plate 46. Components of the force $F_d$ include a force component $f_1$ which is normal to the roller axis of rotation and which causes the roller to rotate about its axis, and a second force component $f_2$ which is parallel to the axis of rotation and which generates a majority of the frictional drag for braking the brake plates 34.

This arrangement results in the roller assembly having a breakout friction which is approximately equal to its running friction. That is, when braking is terminated and brake plates 34 are released from roller assemblies 42, brake plates 34 (and therefore shafts 22, 24) begin rotating again in a relatively smooth manner. This is particularly important when braking has been initiated due to an overrunning load. For example, when retracting an aircraft slat, an overrunning air load may be generated at the outputs to the rotary actuators. A conventional brake which releases in a rough, jerky manner, may introduce large forces which can damage the rotary actuators and connecting torque tubes. In the present invention the brake releases smoothly so that these disruptive forces are not generated.

Referring now to FIGS. 2 and 3, the invention will be described in greater detail. The left housing section 28 includes a lengthwise central passageway 56 which contains therein the left shaft 24 which is supported near the outlet to passageway 56 by a bearing assembly 58 and which is supported near the opposite end of shaft 24 by a bearing assembly 60. The left (output) shaft 24 includes a right end having a spline 66 with a number of circumferential teeth 68.

The right (input) shaft 22 is supported inside a lengthwise passageway 70 of right housing section 28 by a bearing assembly 72 at the input end of the shaft 22, and by another bearing assembly 74 near the left output end of the shaft 22. At the output end of the shaft 22 is a first spline 76 having teeth 77 which is followed downstream by a second spline 78. As shown more clearly in FIG. 4, the splines 76, 78 are the same size as the spline 66 of the output shaft 24, but splines 76, 78 have one half as many teeth as the spline 66.

As shown in FIG. 2, the left brake plate 34 is splined to the output shaft spline 66 and the input shaft spline 78. More specifically, the left brake plate 34 includes a hub 82 having a first set of internal teeth 84 (FIG. 4) at the left end of the hub which engage the spline 66; the hub teeth 84 being the same in number as the spline teeth 68. To the right of the internal teeth 84, the hub 82 includes a second set of internal teeth 86 which engage teeth 87 of the input spline 78; the hub teeth 86 being the same in number as the spline teeth 87, but one half in number as the teeth 68, 84. In other words, the spline teeth 86, 87 are twice as far apart as the spline teeth 68, 84.

With regard to the right brake plate 34 (FIG. 4), it includes a hub 90 which has the same internal diameter as the left hub 82 and which has a number of internal circumferential teeth 92 which engage the spline 76 of the input shaft 22; the hub teeth 92 being the same in number as the spline teeth 77, but one half the number of teeth 68, 84. This arrangement permits so called "lost motion" between input shaft 22 and output shaft 24 during the presence of a reverse load or overrunning load. In this manner, the output brake plate 34 rotates relative to the input brake plate 34. This in turn cams the balls 38 to the shallower portions of the pockets, driving the brake plates apart creating friction (braking) between the output shaft and the housing.

To achieve this braking action, the left skewed roller assembly 42 is mounted on the outside of the left hub 82

(FIG. 2) for rotation thereabout. Likewise, the right skewed roller assembly 42 is mounted on the outside of the right hub 90 for rotation thereabout. Braking is achieved by means of the left friction disc 44 which is attached to the right face of the left housing section 28 by a pin 94, and which is located about the left hub 82. Similarly, the right friction disc 44 is attached to the left face of the right housing section by the pin 47, and the disc 44 is located about the right hub 90.

In order to better understand how the relative motion between the left brake plate 34 and right brake plate 34 is achieved, reference is made to FIG. 4 which shows the internal splines of the brake plates 34 being located above the input shaft 22 and output shaft 24 for ease of explanation. For example, assume the input shaft 22 is operating in the direction of an arrow designated by a number 100. This causes teeth 77, 87 of the input splines to engage teeth 92, 86 of the brake plates 34 at locations shown by the arrows identified by the number 102. Similarly, hub teeth 84 of the left brake plate 34 engage teeth 68 of the output 13 line 66 to rotate the output shaft 24 in the direction of arrow 102. In this position, the balls 38 are located in the deepest portions of the detent pockets.

In the event of a reverse load (with input shaft 22 disconnected from an upstream motor which is not shown), output shaft 24 is caused to rotate in the direction of arrow 104. This reverse torque is transmitted to the left brake plate 34 and to the splines 78, 76 of the input shaft 22 with no lost motion. However, the right brake plate 34 remains stationary until the opposite sides of the hub teeth 92 engage the opposite sides of the spline teeth 77 as indicated by the arrows 106. This lost motion between the left brake plate 34 and the right brake plate 34 causes the balls 38 to move to the shallow portions of the brake plate pockets and forces the brake plates apart.

In order to promote this lost motion, a small amount of drag is placed on the right brake plate 34 to reduce its tendency to rotate when the input shaft is disconnected from the upstream motor. This is accomplished by a small annular thrust bearing race 104 (FIG. 2) which is mounted in a circumferential groove in shaft 22 between the left brake plate 34 and the right brake plate 34. The thrust bearing race 104 bears on a number of balls 106 which roll in an annular groove 108 in the left face of the right brake plate 34. The thrust bearing race 104 is urged in a right axial direction by a spring 110 which is mounted about the right end of the input shaft 22 between the right bearing assembly 72 and a nut 112 which is secured to the input shaft.

In the event of an overrunning load at output shaft 24, the left brake plate 34 is caused to rotate ahead of the right brake plate 34 (FIG. 4) because the right portion of the left brake plate hub 82 and the input shaft spline 87 have one half as many teeth as the left portion of the left brake plate hub 82 and the output shaft spline 66 This lost motion between the left and right brake plates causes the balls 38 to travel to the shallower portions of the brake plate pockets and forces the brake plates apart, thereby braking the input shaft and the output shaft.

Returning to the skewed roller assembly 42, attention is turned to FIGS. 8 and 9 which show that each roller 48 is held within the associated opening 50 by upset (staked) edges 114 of the plate 46.

What is claimed is:

1. A bidirectional brake comprising:
   a. housing means;
   b. rotational shaft means which are supported within the housing means and which have an input end and an output end;
   c. braking plate means which are connected to the shaft means for rotation therewith;
   d. a roller assembly which is supported within the housing means and which includes a planar member which is rotatable about a first axis, the roller assembly further including roller means which are connected to the planar member such that an axis of rotation of the roller means is generally parallel to the planar member and forms an acute angle with an imaginary radial line extending from the first axis to a circumferential edge of the planar member; and
   e. means for moving the braking plate means into engagement with the roller assembly when a reverse or overrunning load is applied to the output end of the shaft means, in a manner that the braking plate means engages the roller means thereby generating a first force component which is normal to the roller axis of rotation and which rotates the roller means, and a second force component which is directed along the axis of rotation of the roller means for generating frictional drag to limit the rotation of the braking plate and the shaft means connected thereto.

2. The bidirectional brake as set forth in claim 1 wherein
   a. the housing means includes friction means; and
   b. the roller assembly is engaged between the braking plate means and the friction means by the moving means in order to generate the frictional drag.

3. The bidirectional brake as set forth in claim 1 wherein the planar member includes a number of openings located about the first axis which contain the roller means therein.

4. The bidirectional brake as set forth in claim 1 wherein:
   a. the rotational shaft means includes an input shaft and an output shaft, the input shaft including input spline means and the output shaft including output spline means;
   b. the braking plate means includes an input braking plate which is connected to the input spline means and an output braking plate which is connected to the input spline means and to the output spline means in a manner that a rotation of the input spline means is transmitted by the output braking plate to the output spline means; and
   c. the input spline means includes a plurality of circumferential teeth which are located a first distance apart, and the output spline means includes a plurality of circumferential teeth which are located a second distance apart which is different from the first distance, so that when the load is applied to the output shaft the output braking plate is allowed to rotate relative to the input braking plate; and
   d. the moving means includes means for moving the input braking plate and the output braking plate apart when the output braking plate rotates relative to the input braking plate so that the input braking plate and the output braking plate engage the roller means.

5. The bidirectional brake as set forth in claim 3 wherein the moving means includes ball means which are located between the input braking plate and the output braking plate in a manner that when the output braking plates moves relative to the input braking plate the ball means moves relative to the input braking plate and the output braking plate to cause the input braking plate and the output braking plate to move axially apart.

6. The bidirectional brake as set forth in claim 4 wherein:
  a. the input spline means includes a first spline and a second spline;
  b. the output braking plate includes a first set of internal spline teeth and a second set of internal spline teeth such that the distance between the first set of internal spline teeth is different from the distance between the second set of internal spline teeth; and
  c. the first spline of the input shaft engages the input braking plate and the second spline of the input shaft engages the first set of internal spline teeth of the output braking plate.

7. The bidirectional brake as set forth in claim 5 wherein the output spline engages the second teeth of the outputbraking plate so that the load that is applied to the output shaft causes the output braking plate to rotate relative to the input braking plate because the distance between the first internal spline teeth is different than the distance between the second internal spline teeth, so as to cause the input braking plate and the output braking plate to move axially apart.

8. The bidirectional brake as set forth in claim 5 wherein the output spline means engages the second teeth of the output braking plate in a manner that when the load that is applied to the output shaft is an overrunning load which causes the output shaft to rotate in a same direction as the input shaft and at a faster rate than the input shaft drives the output shaft, the difference in distances between the first internal spline teeth and the second internal spline teeth of the output braking plate cause the output braking plate to rotate relative to the input braking plate to cause the input braking plate and the output braking plate to move axially apart.

* * * * *